US007958665B2

(12) United States Patent
Hamilton

(10) Patent No.: US 7,958,665 B2
(45) Date of Patent: Jun. 14, 2011

(54) RIFLE SCOPE WITH FRICTION REDUCING ELEMENT

(75) Inventor: Samuel J. Hamilton, Mount Horeb, WI (US)

(73) Assignee: Sheltered Wings, Inc., Middleton, WI (US)

( * ) Notice: Subject to any disclaimer, the term of this patent is extended or adjusted under 35 U.S.C. 154(b) by 296 days.

(21) Appl. No.: 12/381,325

(22) Filed: Mar. 11, 2009

(65) Prior Publication Data

US 2009/0241399 A1 Oct. 1, 2009

(51) Int. Cl.
*F41G 1/38* (2006.01)
*G02B 23/00* (2006.01)

(52) U.S. Cl. .............. 42/119; 42/122; 42/126; 359/405; 359/428; 359/429

(58) Field of Classification Search .................... 42/119, 42/120, 122; 359/405, 428, 429
See application file for complete search history.

(56) References Cited

U.S. PATENT DOCUMENTS 4,286,388 A * 9/1981 Ross et al. ...................... 42/122
4,806,007 A * 2/1989 Bindon .......................... 359/424
6,640,481 B1 * 11/2003 Williams, Jr. ................... 42/126
7,440,185 B1 * 10/2008 Thorpe et al. ................. 359/429
7,640,830 B2 * 1/2010 Bonis .......................... 74/813 L

* cited by examiner

*Primary Examiner* — Bret Hayes
*Assistant Examiner* — Joshua Freeman
(74) *Attorney, Agent, or Firm* — Bennet K. Langlotz; Langlotz Patent & Trademark Works, Inc.

(57) ABSTRACT

Rifle scopes with friction reducing elements include a scope body, a movable optical adjustment element connected to the scope body, and a turret rotatably connected to the scope body. The turret includes a contact element contacting the adjustment element at a location of contact. The contact element is rotatable with respect to the turret. The adjustment element at the location of contact differs in hardness from the hardness of a second portion of the adjustment element. The contact element at the location of contact and the adjustment element at the location of contact are of essentially equal hardness.

14 Claims, 5 Drawing Sheets

RIFLE SCOPE WITH FRICTION REDUCING ELEMENT

FIELD OF THE INVENTION

The present invention relates to a rifle scope with friction reducing element that reduces wear and inaccuracy in the adjustment mechanism.

BACKGROUND OF THE INVENTION

Rifle scopes typically use an erecting image system located within the scope tube somewhere between the objective lens and the ocular lens in order to flip the image. This gives the image the correct orientation for land viewing. The erecting image system is usually contained within an erector tube that is held at one end with a gimbal or some other support that allows the tube to pivot about that end.

The opposite end of the erector tube is typically supported by an elevation screw, which is positioned at the top of the erector tube, a windage screw positioned on one side of the erector tube, and a biasing spring or spring system positioned at an angle diagonally opposite the windage and elevation screws. Together, the three supporting pieces constrain the movement and establish the position of the erector tube and allow the user to precisely adjust the position of the erector tube by adjusting the windage and elevation screws. The windage and elevation screws are used to adjust elevation and windage for points of impact change.

One of the biggest problems encountered when designing an erector tube system for a rifle scope results from the extremely tight tolerances required for accurate aiming and tracking of the adjustment system. For example, it is typical that a rifle scope will be adjusted in ¼ Minute of Angle (MOA) increments, or in 1/10 milliradian (mrad) increments. In one example of a rifle scope, a ¼ MOA of adjustment results in about 0.01 mm of movement of the erector tube. This is an extremely small measurement and illustrates how precise the mechanical components need to be in order to achieve accurate performance of the rifle scope.

In addition, rifle scopes are often subject to significant shock from the recoil of the rifle to which they are attached. This means the points of contact on the end of the erector tube (the elevation screw, windage screw, and biasing spring) must be extremely stable to ensure that the point of aim does not shift under shock load from the weapon. Accordingly, the spring force used in the biasing springs of rifle scopes is typically very high to ensure that there is no movement of the erector tube under recoil.

Conventional materials used in these components are brass or aluminum for the windage and elevation screws, brass or aluminum for the erector tube, and steel alloys for the biasing spring. Other materials have been used in these applications as well. However, the highest quality rifle scopes tend to use brass screws for windage and elevation adjustments, brass or aluminum for the erector tube, and steel or titanium for the biasing spring. Brass is prevalent because of its inherent anti-galling properties, which makes it ideal to use for adjustment screws instead of steel or other harder alloys. Galling is a condition whereby excessive friction between high spots results in localized welding with subsequent splitting and a further roughening of rubbing surfaces of one or both of two mating parts, resulting in inaccuracy.

Through extensive testing and analysis of existing rifle scopes, a significant problem with current designs was found. Specifically, the points of contact between the erector tube and the biasing spring, windage screw, and elevation screw experience deformation after a period of use. It is believed this occurs because the brass used in the windage and elevation screws is a soft material, as is the brass or aluminum used in the erector tube. Deformation of these materials occurs after prolonged exposure to the constant high stress imparted by a stiff biasing spring. The deformation of the erector tube, windage screw, and elevation screw causes inconsistency in the tracking of the rifle scope when adjusting the windage and elevation screws, thereby impairing the rifle scope's performance.

One prior art improvement to the conventional rifle scope design was to use a steel reinforcing ring (or some other very hard material, such as tungsten carbide) as a collar on the end of the erector tube for the biasing spring, windage screw, and elevation screw to contact. The hardened ring is much stronger, stiffer, and resistant to deformation, so this helps prolong the life of the system. However, this design creates a new problem because the hardened ring is a much harder surface than the brass windage and elevation screws that it presses against. Contacting the harder surface of the ring with the softer brass of the screws causes the brass end of the screws to deform over time with repeated adjustment of the screws.

It is believed the end of the screws deforms because of two actions occurring at the end of the screws: the spinning action of the screw as it is turned against the hardened ring, and the sliding action of the hardened ring against the screw tip as the opposite screw is adjusted. The amount of deformation is accentuated because the hardened ring on the end of the erector tube is cylindrical and contacts a flat surface of the screw tip. This tangential interface between the two parts means that the surface area of contact between the two surfaces is very small, essentially a line of contact at which rubbing occurs. A small surface area with a high bias spring pressure means that there is intense pressure applied to the end of the windage and elevation screws. This small line of contact is a concern in conventional scopes not using a hard ring as well.

Therefore, a need exists for a new and improved rifle scope with friction reducing element that prevents deformation of the windage and elevation screws. In this regard, the various embodiments of the present invention substantially fulfill at least some of these needs. In this respect, the rifle scope with friction reducing element according to the present invention substantially departs from the conventional concepts and designs of the prior art, and in doing so provides an apparatus primarily developed for the purpose of prevents deformation of the windage and elevation screws.

SUMMARY OF THE INVENTION

The present invention provides an improved rifle scope with friction reducing element, and overcomes the above-mentioned disadvantages and drawbacks of the prior art. As such, the general purpose of the present invention, which will be described subsequently in greater detail, is to provide an improved rifle scope with friction reducing element that has all the advantages of the prior art mentioned above.

To attain this, the preferred embodiment of the present invention essentially comprises a scope body, a movable optical adjustment element connected to the scope body, and a turret rotatably connected to the scope body. The turret includes a contact element contacting the adjustment element at a location of contact. The contact element is rotatable with respect to the turret. The adjustment element at the location of contact differs in hardness from the hardness of a second portion of the adjustment element. The contact element at the location of contact and the adjustment element at the location of contact are of essentially equal hardness. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

Description of the Current Embodiment

Figure 1:
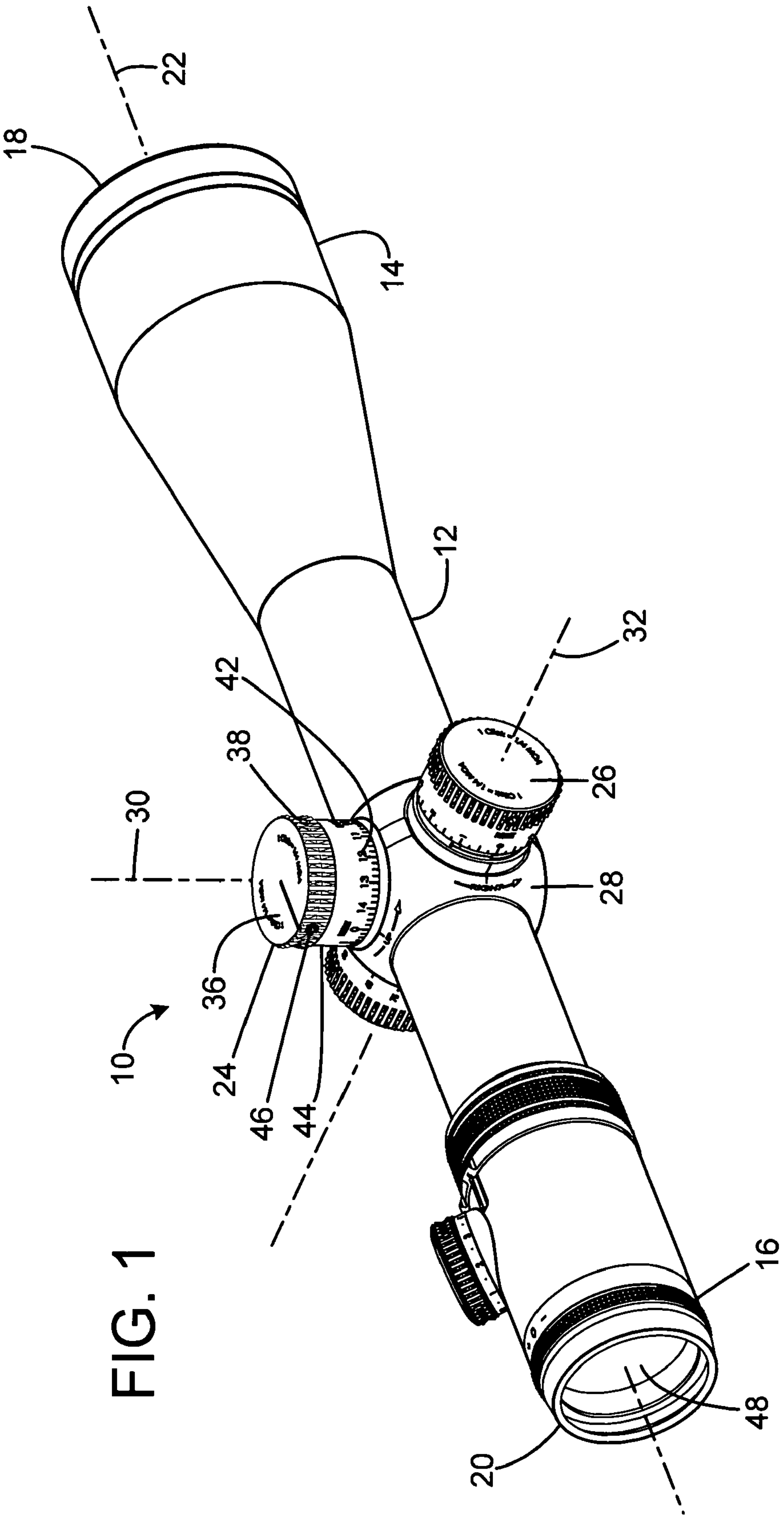
FIG. 1 is a top perspective view of the current embodiment of the rifle scope with friction reducing element constructed in accordance with the principles of the present invention.

A preferred embodiment of the rifle scope with friction reducing element of the present invention is shown and generally designated by the reference numeral 10.

FIG. 1 illustrates the improved rifle scope 10 with friction reducing element of the present invention. More particularly, the rifle scope 10 has a scope body 12 that encloses a movable erector tube 50 (shown in FIG. 2). The scope body 12 is an elongate tube tapering from a larger opening at its front 14 to a smaller opening at its rear 16. An eyepiece 20 is attached to the rear of the scope body, and an objective lens 18 is attached to the front of the scope body. The center axis of the scope body 12 defines the optical axis 22 of the rifle scope.

An elevation turret 24 and a windage turret 26 are two knobs in the outside center part of the scope body 12. They are marked in increments by indicia 42 on their perimeters 44 and are used to adjust the elevation and windage of the erector tube for points of impact change. These knobs protrude from the turret housing 28. The turrets are arranged so that the elevation turret rotation axis 30 is perpendicular to the windage turret rotation axis 32. The elevation turret rotation axis protrudes from the top of the scope body, and the windage turret rotation axis protrudes from the side of the scope body.

The erector tube is adjusted by rotating the turrets one or more clicks. A click is one tactile adjustment increment on the windage or elevation turret of the rifle scope, each of which corresponds to an indicium 42 such as a tick mark, number or other marking. One click may change a scope's point of impact by ¼ inch at 100 yards, but may also be in other click values, such as ½ inch, 0.1 milliradian, etc. In the illustrated embodiment, one click equals ¼ Minute of Angle. Minute of Angle (MOA) is a unit of measurement of a circle, which is 1.0472 inches at 100 yards. Conventionally, it is referred to as being 1 inch at 100 yards, 2 inches at 200 yards, 5 inches at 500 yards, ½ inch at 50 yards, etc.

Figure 2:
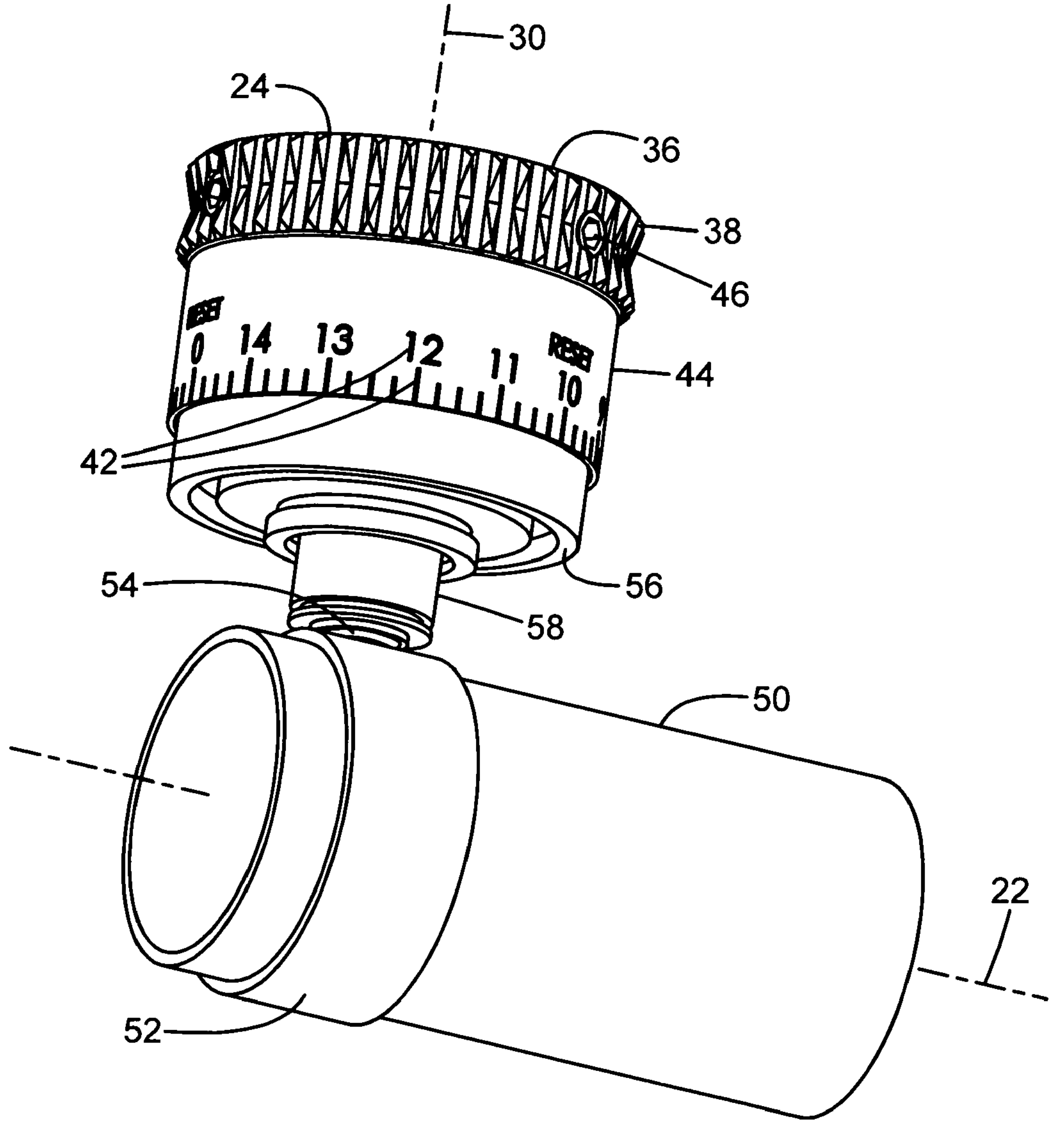
FIG. 2 is a bottom perspective view of the current embodiment of the elevation turret of the present invention.

FIG. 2 illustrates the improved elevation turret 24 of the present invention. More particularly, the turret 24 is a cylindrical body with a top 36, a bottom 56, and a perimeter 44. The top portion 38 of the perimeter 44 of the turret 24 is knurled or otherwise textured or ruggedly contoured to facilitate gripping for rotation of the turret. Indicia 42 are positioned around the perimeter and correspond to clicks of the turret. Indicia typically include tick marks, each corresponding to a click, and larger tick marks at selected intervals, as well as numerals indicating angle of adjustment or distance for bullet drop compensation. Bolts 46 connect the turret to an elevation screw 58 protruding from the bottom of the turret. The bolts 46 permit the turret to be re-zeroed or completely removed from the turret mechanism. Zero is the distance the rifle scope is sighted in at when no clicks have been dialed in on the turret and references the flight of the projectile. If the rifle scope is sighted in at 200 yards, it is said to have a 200 yard zero. Rotation of the turret adjusts the amount of the elevation screws that extends from the bottom of the turret. The elevation screw is made of brass in the illustrated embodiment.

A friction reducing element 54 protrudes from the bottom of the elevation screw and contacts a reinforcing ring 52 encircling an erector tube 50. The erector tube is an elongate tube made of brass and the reinforcing ring is made of steel in the illustrated embodiment. The reinforcing ring can also be made of tungsten carbide or any other suitable hard material.

Figure 3:
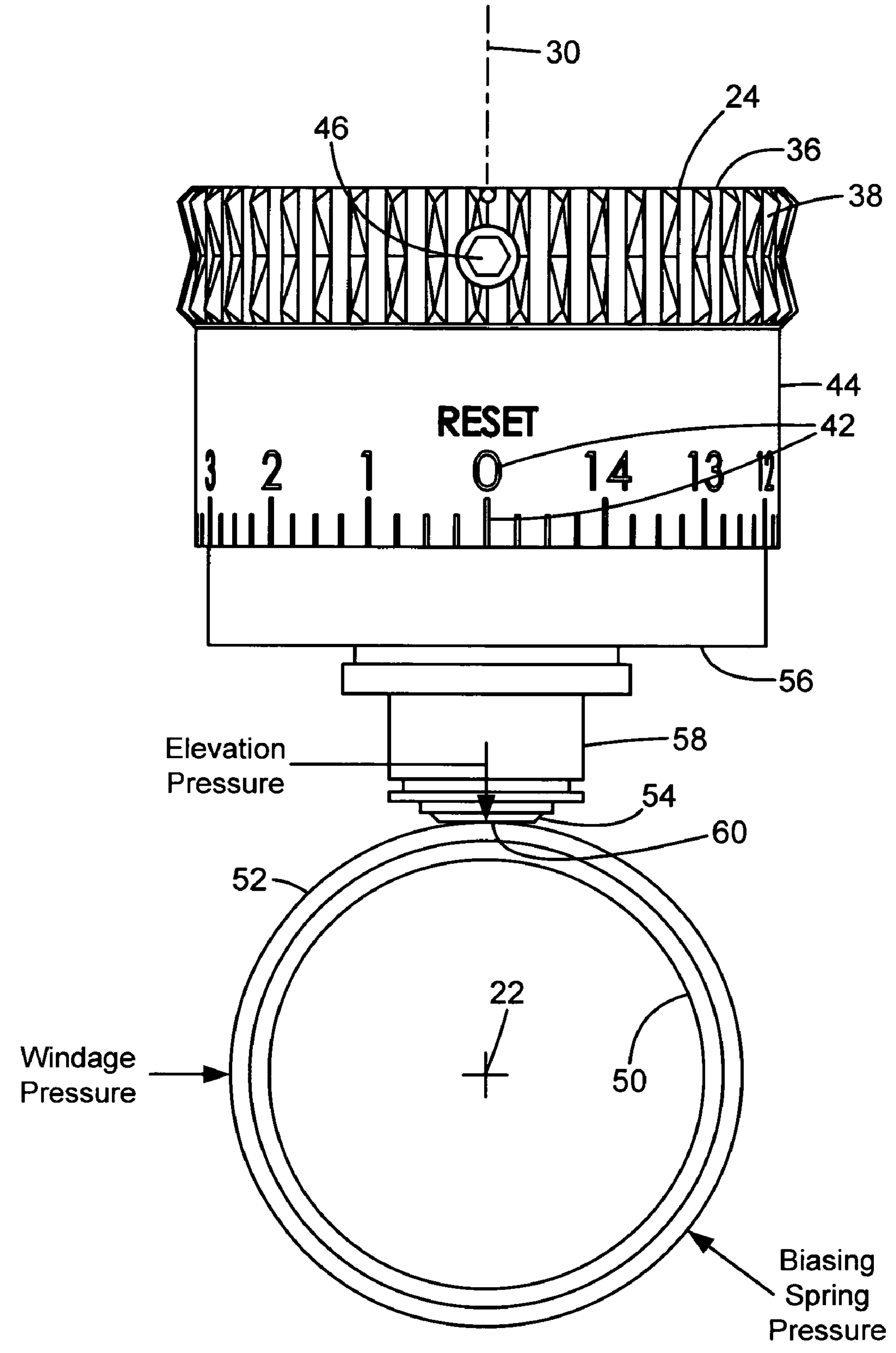
FIG. 3 is a side view of the current embodiment of the elevation turret of the present invention.

FIG. 3 illustrates the improved elevation turret 24 of the present invention. More particularly, elevation pressure, windage pressure, and biasing spring pressure are denoted by arrows. The elevation turret 24 applies a downward force in the form of elevation pressure to the erector tube 50 via the reinforcing ring 52. The windage turret 26 applies a sideways force in the form of windage pressure to the erector tube via the reinforcing ring. These forces are balanced by a biasing spring pressure applied to the erector tube via the reinforcing ring at an angle of about 135° with respect to both the windage pressure and elevation pressure by a biasing spring. The hard reinforcing ring prevents the softer erector tube from deforming under these pressures.

However, placing the softer elevation screw 58 in direct contact with the hard reinforcing ring would result in deformation of the elevation screw over time. This may occur due to peening of the brass screw by the line of contact with the ring from the effects of recoil while the turret is in the same position (such as a zero setting). This may also occur as a result of the effect of wear by the hard ring on the soft screw at the limited area high pressure line or stripe of contact. Such deformation would adversely affect the performance of the rifle scope. Therefore, the friction reducing element is used to transfer force from the elevation screw to the reinforcing ring.

The effect of hardness on the coefficient of friction is a very important consideration in choosing friction pairs for working junctions. Friction involves mechanisms of energy dissipation during relative motion. Because of the undulations and roughness of surfaces, contact is always made at discrete points, so the forces with which the elements of the pair interact consist of the elementary forces acting at individual points. As two surfaces are brought into contact, contact occurs at the tips of asperities. The load is supported by the deformation of contacting asperities, and discrete contact spots are formed. Friction of solids is governed by the processes which occur at these points that are actually in contact.

Friction arises because of adhesion and deformation. The elementary force depends on the nature and degree of deformation of the material at the contact point. The deformation component of friction is a function of the relative hardnesses and surface roughnesses of the interface materials and the probability of wear particles being trapped at the interface. The deformation component of friction can be reduced by reducing interface roughness, by selecting materials of more or less equal hardness, and by removing wear and contaminant particles from the interface. Use of a friction reducing element that is of essentially equal hardness to the reinforcing ring at the contact surface 60 reduces friction between them. This decreased friction reduces wear of the friction reducing element and the reinforcing ring at the contact surface, preventing degradation of the rifle scope's performance over time from deformation of the elevation screw.

Figure 4:
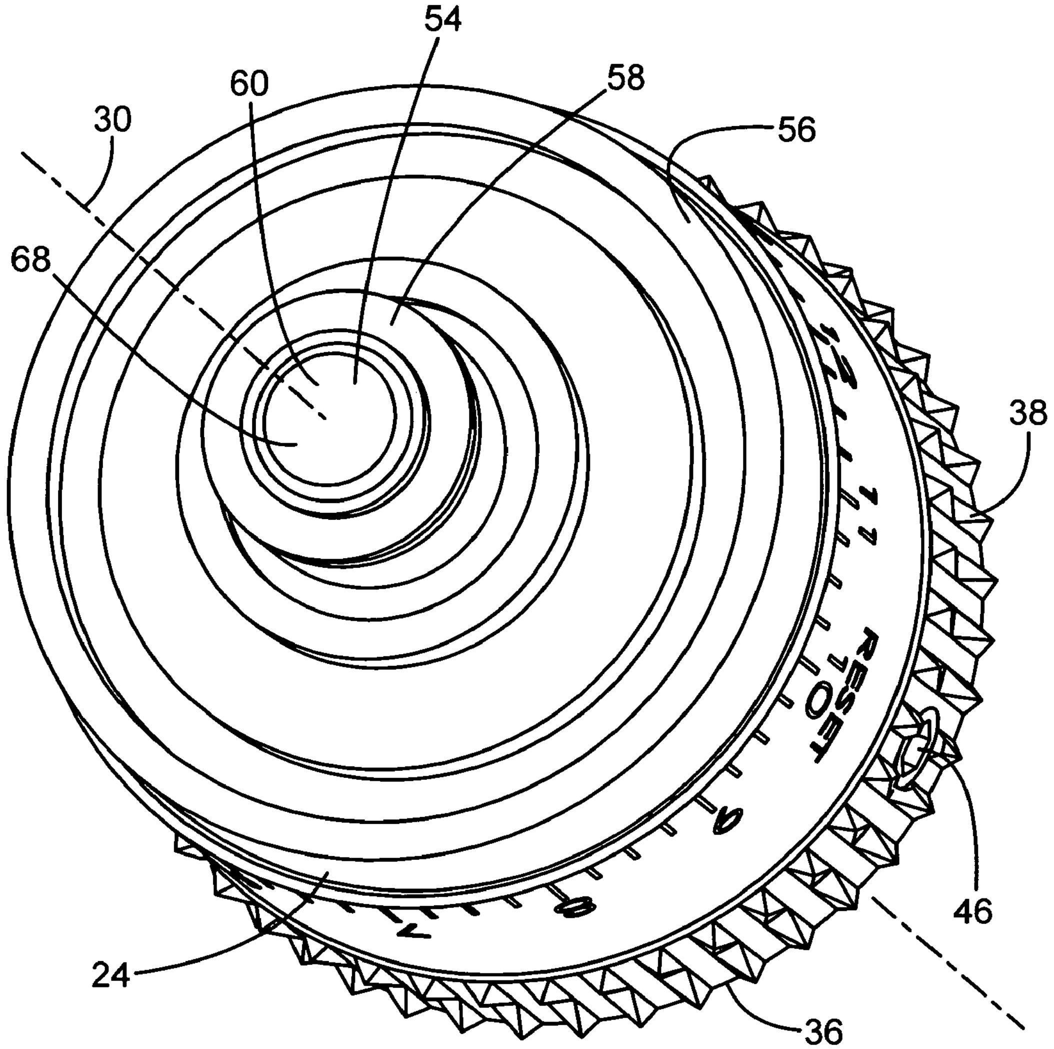
FIG. 4 is a bottom perspective of the current embodiment of the elevation turret of the present invention.

FIG. 4 illustrates the improved elevation turret 24 of the present invention. More particularly, the elevation turret 24 has a friction reducing element 54 placed on the bottom 56 end of the elevation screw 58. The friction reducing element 54 is a flat hardened disc that is made of steel in the illustrated embodiment. However, it can be made of tungsten carbide or any other very hard material that is of essentially equal hardness to the hardened reinforcing ring 52 on the erector tube 50.

Figure 5:
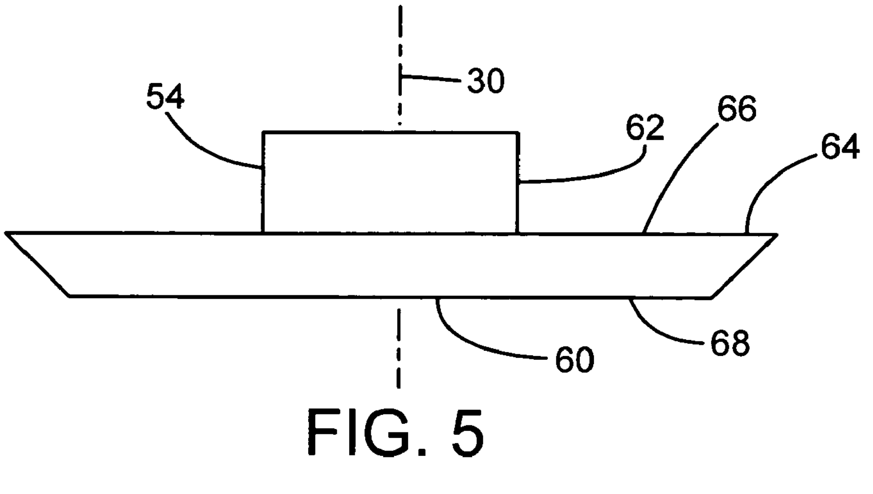
FIG. 5 is a side view of the current embodiment of the friction reducing element of the present invention.

FIG. 5 illustrates the friction reducing element 54 of the present invention. More particularly, the friction reducing element 54 has a disc portion 64 whose bottom 68 is a lower cylindrical surface that contacts the reinforcing ring 52 at the contact surface 60. The top 66 of the disc portion is an upper annular surface that is attached to one end of a post 62. The post is a cylindrical body that is inserted into a hole 70 in the bottom 56 end of the elevation screw 58. In the illustrated embodiment, the post and the disc portion are of essentially equal hardness to the hardness of the reinforcing ring 52. However, the contact surface could be of essentially equal hardness to the hardness of the reinforcing ring while the rest of the friction reducing element is of a different hardness. Alternatively, the post could differ in hardness from the hardness of the disc portion. Furthermore, the post and the top of the disc portion could be of essentially equal hardness to the hardness of the elevation screw while the bottom of the disc portion could be of a different hardness that is essentially equal to the hardness of the reinforcing ring. The friction reducing element can be constructed in one piece, as a series of laminates, and/or with one or more coatings to result in the friction reducing element having constant or varying hardness characteristics at its various external surfaces.

Figure 6:
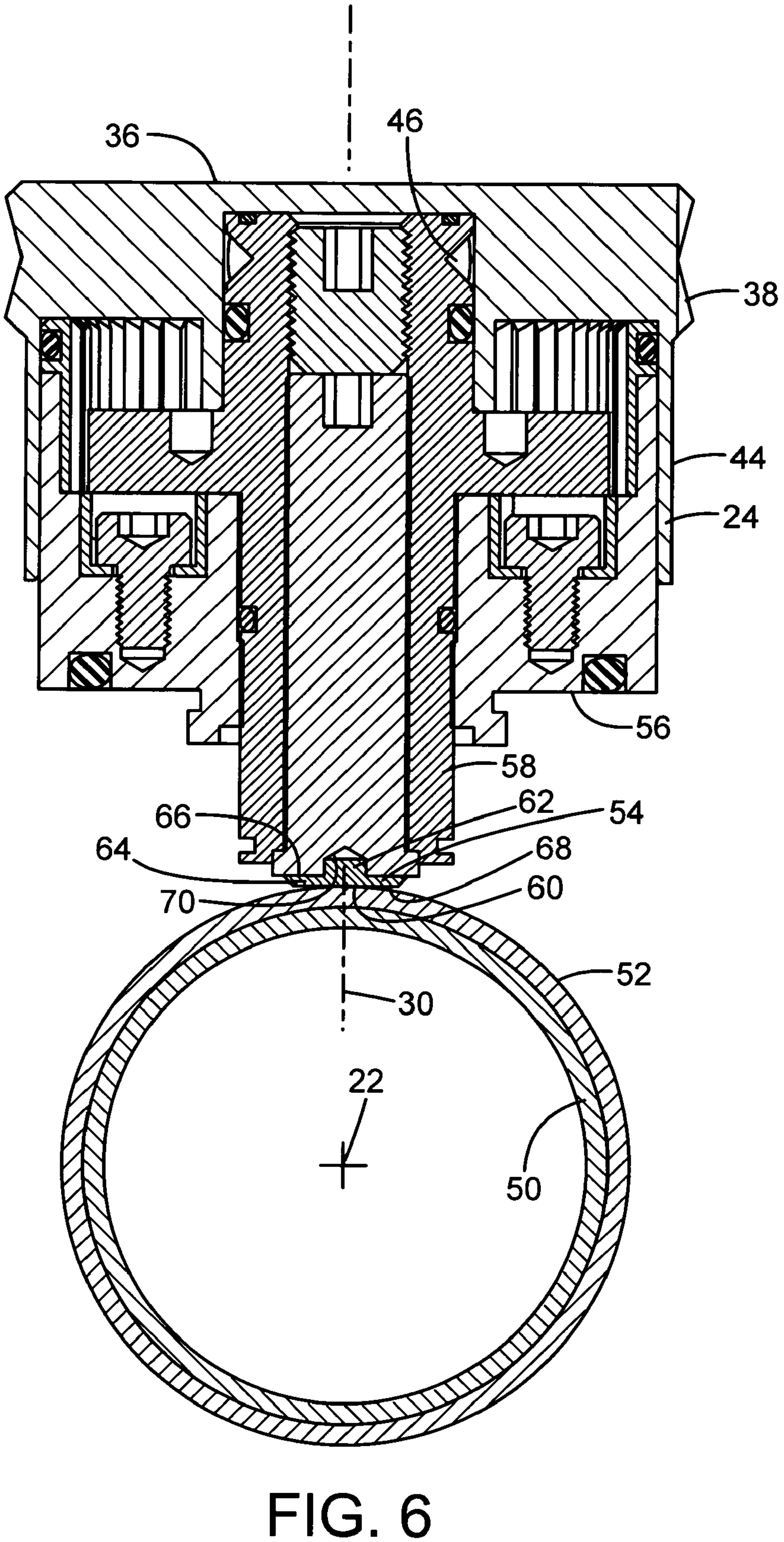
FIG. 6 is a side sectional view of the current embodiment of the elevation turret of the present invention.

FIG. 6 illustrates the improved elevation turret 24 of the present invention. More particularly, the elevation turret 24 has a friction reducing element 54 placed on the bottom 56 end of the elevation screw 58. A limited amount of free space between the post 62 of the friction reducing element and a bore 70 machined into the bottom end of the elevation screw permits the post to freely rotate within the confines of the elevation screw. The post limits the movements of the friction reducing element. In conjunction with the force of the reinforcing ring against the bottom 68 of the disc portion 64, the post constrains the friction reducing element 54 in all axes except for its rotational axis 30 about the post.

The disc is purposefully left unconstrained about its rotational axis so that as the elevation screw is turned, friction against the bottom of the disc portion where it interfaces with the reinforcing ring will cause the disc to remain stationary as the screw rotates around the post and top of the disc portion. This causes the frictional forces that would normally be dragging across the bottom face of the disc to be transferred to the top face of the disc. Instead of the bare elevation screw being turned against a very small surface area on the reinforcing ring at high pressure, the pressure is now spread across the entire face of the elevation screw. This prevents deformation of the elevation screw.

The disc will always rotate about the same axis with respect to the screw, so that it "beds in" for smooth and limited friction. In contract, a conventional turret screw rotates about various points on the erector tube as the other turret is adjusted to shift the erector tube. Also, the engagement surface that bears frictional effects as a turret rotates is an annulus of substantial area, reducing pressure, and thus wear. This contrasts to the narrow line of contact in the conventional scopes. Furthermore, the only friction between the disc and the tube is a linear motion of limited distance, which can also provide a low-friction bedding effect as the disc is essentially rotationally engaged to the tube.

Deformation of the erector tube is prevented by the use of the reinforcing ring and the friction reducing element. When the erector tube slides across the face of the turret screw, two hardened surfaces of the essentially equal hardness slide against one another. In contrast, prior art designs place two soft materials in contact or a hard material in contact with a much softer material. The hardened surfaces used in the present invention are much more resistant to deformation. Use of the friction reducing element allows the mechanical components of the erector system to have greatly increased durability over traditional components currently used in rifle scopes. However, several of the principles and features of the invention may be employed with any material or combination of materials.

While a current embodiment of the rifle scope with friction reducing element has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although placing a friction reducing element on the bottom end of the elevation screw has been described, it should be appreciated that the friction reducing element herein described is also suitable for being placed on the bottom end of the windage screw. Furthermore, the erector tube could be made from a hardened material that is essentially the same hardness as the material used for the friction reducing element but that differs in hardness from the material used for the screw. In this case, the hardened reinforcing ring encircling the erector tube would be an optional component. Alternatively, the screw could also be made from a hardened material that is essentially the same hardness as the material used for the friction reducing element. Finally, the erector tube, friction reducing element, and screw could all be made of brass, with a brass reinforcing ring encircling the erector tube as an optional component.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rifle scope comprising:

a scope body;

a movable reinforcing ring connected to the scope body;

a turret rotatably connected to the scope body;

the turret including a friction reducing element contacting the reinforcing ring at a location of contact, wherein the friction reducing element differs in hardness from the hardness of a portion of the turret to which the friction reducing element is attached; and the friction reducing element being rotatable with respect to the turret.

2. The rifle scope of claim 1, wherein the friction reducing element has a flat surface that engages a portion of the turret to which the friction reducing element is attached.

3. The rifle scope of claim 1, wherein the friction reducing element has a flat surface that faces away from the turret.

4. The rifle scope of claim 1, wherein the reinforcing ring has a cylindrical exterior surface at the location of contact.

5. The rifle scope of claim 1, further comprising:

the reinforcing ring at the location of contact differing in hardness from the hardness of an erector tube encircled by the reinforcing ring; and the friction reducing element at the location of contact and the reinforcing ring at the location of contact being of essentially equal hardness.

6. The rifle scope of claim 5, wherein the friction reducing element in its entirety is of essentially equal hardness to the hardness of the reinforcing ring at the location of contact.

7. The rifle scope of claim 1, wherein the friction reducing element and a portion of the turret to which the friction reducing element is attached are of essentially equal hardness.

8. The rifle scope of claim 1, wherein a portion of the friction reducing element that is attached to the turret and a portion of the turret to which the friction reducing element is attached are of essentially equal hardness.

9. A rifle scope comprising:

a scope body;

a movable reinforcing ring connected to the scope body;

a turret rotatably connected to the scope body;

the turret including a friction reducing element;

the friction reducing element having a contact surface facing away from the turret;

the friction reducing element having a contact surface facing towards the turret;

the contact surface facing away from the turret contacting the reinforcing ring at a location of contact, wherein the contact surface facing towards the turret differs in hardness from the hardness of a portion of the turret to which the friction reducing element is attached; and the contact surface facing towards the turret being rotatable with respect to the turret.

10. The rifle scope of claim 9, further comprising:

the reinforcing ring at the location of contact differing in hardness from the hardness of an erector tube encircled by the reinforcing ring; and the friction reducing element at, the location of contact and the adjustment element at the location of contact being of essentially equal hardness.

11. The rifle scope of claim 9, wherein the contact surface facing towards the turret and the contact surface facing away from the turret are of essentially equal hardness.

12. A rifle scope comprising:

a scope body;

a movable reinforcing ring connected to the scope body;

a turret rotatably connected to the scope body;

the turret including a friction reducing element;

the friction reducing element comprising an upper annular surface contacting the turret;

the friction reducing element comprising a lower cylindrical surface facing away from the turret;

the lower cylindrical surface contacting the reinforcing ring at a location of contact, wherein the upper annular surface differs in hardness from the hardness of a portion of the turret with which the upper annular surface is in contact; and the upper annular surface being rotatable with respect to the turret.

13. The rifle scope of claim 12, further comprising:

the lower cylindrical surface at the location of contact differing in hardness from the hardness of an erector tube encircled by the reinforcing ring; and the lower cylindrical surface at the location of contact and the friction reducing element at the location of contact being of essentially equal hardness.

14. The rifle scope of claim 12, wherein the upper annular surface and the lower cylindrical surface are of essentially equal hardness.

* * * * *